United States Patent
Sedlak

(10) Patent No.: US 10,538,158 B2
(45) Date of Patent: Jan. 21, 2020

(54) VEHICLE FRONT STRUCTURE COMPRISING A HORN

(71) Applicant: Volvo Car Corporation, Göteborg (SE)

(72) Inventor: Vojtech Sedlak, Göteborg (SE)

(73) Assignee: Volvo Car Corporation, Göteborg (SE)

( * ) Notice: Subject to any disclaimer, the term of this patent is extended or adjusted under 35 U.S.C. 154(b) by 0 days.

(21) Appl. No.: 16/271,957

(22) Filed: Feb. 11, 2019

(65) Prior Publication Data

US 2019/0270376 A1    Sep. 5, 2019

(30) Foreign Application Priority Data

Mar. 5, 2018   (EP) .................................... 18159953

(51) Int. Cl.
| | |
|---|---|
| B60K 11/04 | (2006.01) |
| B60Q 5/00 | (2006.01) |
| B60K 11/08 | (2006.01) |
| G10K 9/22 | (2006.01) |
| G10K 11/00 | (2006.01) |

(52) U.S. Cl.
CPC ............ B60K 11/04 (2013.01); B60K 11/085 (2013.01); B60Q 5/00 (2013.01); G10K 9/22 (2013.01); G10K 11/004 (2013.01)

(58) Field of Classification Search
CPC ......... B60K 11/04; B60K 11/06; B60K 11/08; B60K 11/085; B60Q 5/00; G10K 9/22; G10K 11/004
USPC .............................. 180/68.1, 68.2, 68.3, 68.4
See application file for complete search history.

(56) References Cited

U.S. PATENT DOCUMENTS

| | | | | |
|---|---|---|---|---|
| 4,717,906 | A  * | 1/1988 | Smith ...................... | G10K 9/13 |
| | | | | 116/137 R |
| 9,834,087 | B2 * | 12/2017 | Aoki ...................... | B60K 11/08 |
| 9,840,144 | B2 * | 12/2017 | Aizawa ................ | B60K 11/085 |
| 2014/0254815 | A1 | 9/2014 | Fulton et al. | |

(Continued)

FOREIGN PATENT DOCUMENTS

| | | |
|---|---|---|
| DE | 102010010655 A1 | 9/2011 |
| DE | 102010017320 A1 | 12/2011 |

(Continued)

OTHER PUBLICATIONS

Translation of JP2012-017036A, Jan. 26, 2012.*
Jun. 29, 2018 European Search Report issue on International Application No. EP18159953.

*Primary Examiner* — John D Walters
(74) *Attorney, Agent, or Firm* — Clements Bernard PLLC; Christopher L. Bernard

(57) ABSTRACT

The present invention relates to a vehicle front structure including: a cooling device adapted to contain a cooling fluid configured to be cooled by an airflow received when the vehicle is moving; a shutter unit arranged to control the air flow and to redirect the air flow towards the cooling device, an air guide arranged in front of and adjacent the shutter unit, the air guide is arranged to redirect air flow coming from the forward direction of the vehicle towards the shutter unit; a horn unit configured to provide a sound output signal to a sound output portion attached to the air guide in such a way that an air tight seal is formed between a rim of the sound output portion and the air guide.

13 Claims, 6 Drawing Sheets

(56) References Cited

U.S. PATENT DOCUMENTS

2016/0368364 A1 12/2016 Masato
2017/0050509 A1 2/2017 Aizawa et al.

FOREIGN PATENT DOCUMENTS

| DE | 102014102417 A1 | 9/2014 |
| EP | 2800092 A2 | 11/2014 |
| JP | 2012017036 A | 1/2012 |
| JP | 2017039368 A | 2/2017 |
| KR | 20170041059 A | 4/2017 |

* cited by examiner

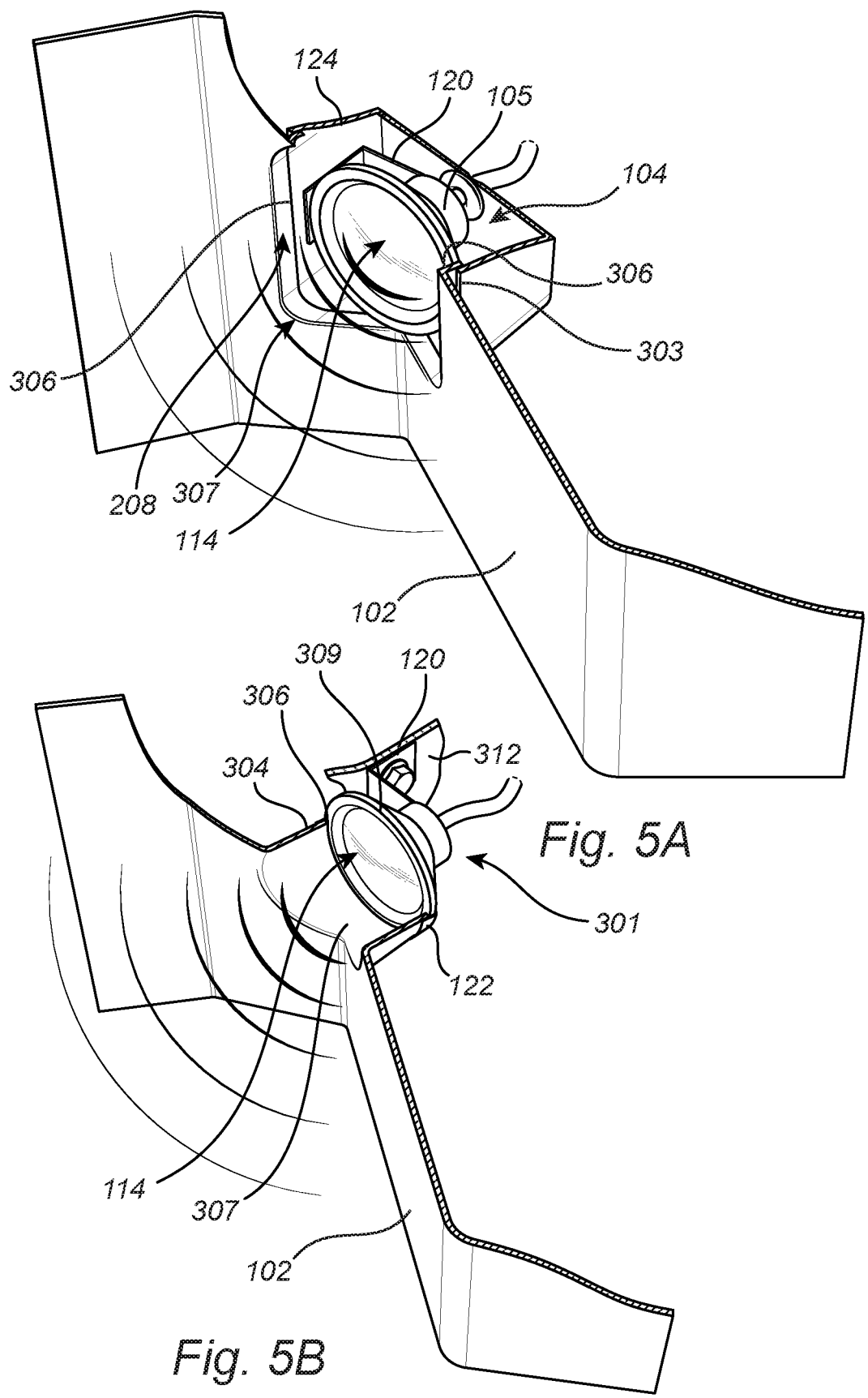

VEHICLE FRONT STRUCTURE COMPRISING A HORN

CROSS-REFERENCE TO RELATED APPLICATION

The present patent application/patent claims the benefit of priority of co-pending European Patent Application No. 18159953.1, filed on Mar. 5, 2018, and entitled "VEHICLE FRONT STRUCTURE COMPRISING A HORN," the contents of which are incorporated in full by reference herein.

TECHNICAL FIELD

The present invention relates to a vehicle front structure comprising a horn.

BACKGROUND ART

Vehicles typically comprise a grille which allows air to enter the vehicle front part. The air is passed through a shutter before it reaches a cooler such as a radiator arranged for cooling the vehicle engine. In order to increase the air flow to the radiator when the shutter is open air guides may be arranged to guide the air towards the shutter. In addition, when the shutter is closed the air guide may help to reduce the leakage of air passed the shutter and into the engine space of the vehicle.

In addition to the above, a horn needs to be placed such that the sound from the horn can come out with sufficient intensity without interfering with the positioning or function of the shutter or air guides. Often, horn openings are made in various parts of the vehicle, for instance in the bumper of the vehicle, in order for the sound intensity to be sufficiently high outside the vehicle. Horn openings and the location of the horn itself thus provides issues related to increased aerodynamic drag which leads to increased $CO_2$ emissions, and design issues for the vehicle.

DE102010010655 discloses one example arrangement of a horn behind the grill of the front part of the vehicle. In order to allow sufficient sound intensity to reach the outside of the vehicle, an air guidance device is provided with through-holes. The horn is arranged directly behind the air guide, thus the through holes are needed for ensuring that the sound intensity outside the vehicle is high enough. However, such through-holes have negative impact on e.g. aerodynamic drag and $CO_2$ emissions.

Accordingly, there appears to be room for improvement with regards to providing sufficient sound intensity from a vehicle horn without significant air-leakage.

SUMMARY

In view of above-mentioned prior art, it is an object of the present invention to provide a vehicle front structure with a positioning of a horn which allow for improved signal strength outside the vehicle without significant air-leakage.

According to a first aspect of the invention, there is provided a vehicle front structure comprising: a cooling device comprising a cooling fluid configured to be cooled by an airflow received when the vehicle is moving; a shutter unit arranged to control the air flow and to redirect the air flow towards the cooling device, an air guide arranged in front of and adjacent the shutter unit, the air guide is arranged to redirect air flow coming from the forward direction of the vehicle towards the shutter; a horn unit configured to provide a sound output signal to a sound output portion attached to the air guide in such a way that an air tight seal is formed between a rim of the sound output portion and the air guide.

The present invention is based on the realization that the sound from the horn unit can be allowed to travel freely into an open space between the air guide, the shutter, and a spoiler mesh by integrating the horn unit in the air guide with an air tight seal between the air guide and a sound output portion for the horn unit. Thus, no additional air-leakage is caused by the positioning of the horn unit since the sound output portion is attached to the air guide via an air-tight seal. Furthermore, the location of the air guide is such that it is configured to redirect incoming air coming from directly in front of the vehicle, towards the shutter. Consequently, the location of the horn unit and the sound output portion as attached to the air guide is beneficial for allowing sound waves to reach the outside of the vehicle with sufficiently high sound intensity.

Accordingly, the invention provides advantages in relation to reducing air-leakage due to horn openings which are no longer required. This leads to reduced aerodynamic drag, reduced $CO_2$ emissions, and improved design freedom.

A shutter unit may comprise flaps to control the air flow and to redirect the air flow towards the cooling device. The flaps may be rectangular in shape and rotatable such as to close or open an inlet towards the outside surface of the cooling device. Thus, the flaps may for example block the air flow or allow the air flow through the shutter unit by a rotational movement of the flaps.

A cooling device may generally serve to provide cooling fluid or cooled fluid to the engine or other areas such as an air conditioning of the vehicle. For example, for one possible cooling device the cooling fluid exchanges heat with the engine and the heated fluid is returned to the cooling device where is it cooled by the inflow or air through the shutter. A cooling device may be generally known as a radiator for cooling a vehicle engine.

An air guide is shaped and positioned to redirect incoming air flow towards the shutter unit. The air guide thus ensures that a higher air flow is provided to the shutter unit than without the air guide. The air guide may comprise of one or several parts, where the parts may have independent main functions (e.g. lower crash beam). The air guide may be formed as an airtight funnel. The air guide is preferably relatively rigid and may be made from e.g. a metal or a plastic material.

A horn unit is configured to provide a sound signal to the exterior of the vehicle. Thus, a horn unit may be used for signaling to pedestrians or drivers of other vehicles for catching their attention or providing a warning signal. The horn unit may comprise a horn bell or a speaker and control circuitry for providing electric control signals and power for generating the sound.

Sound output from a horn may come in e.g. short bursts of sound or longer duration of sounds and with various sound intensity. Further, a horn unit may provide sound to provide an indication that a "quiet" vehicle is approaching. Such a quiet vehicle may for example be an electric vehicle which does not produce the relatively load engine noise that an internal combustion engine traditionally generates. A horn producing or longer but less intense sound output for quiet vehicles (e.g. electric vehicles) can be referred to as ESM (Exterior sound module).

Preferably, the sound output portion is facing at least partly in a forward direction of the vehicle. The sound output portion may have a plane formed by the rim of the sound output portion. A normal of this plane may be arranged at an angle with respect to the forward direction of the vehicle. In this way, it is ensured that the sound is emitted in a forward direction out from the vehicle front structure.

In some embodiments of the invention, wherein the horn unit is arranged in a housing, wherein the sound output portion is part of the housing, whereby the rim of the housing walls are attached to the air guide in an cut-out portion of the air guide in an air tight sealing manner. The horn unit may comprise a horn-bell and additional components such as an electrical circuit, a diaphragm, etc. By placing the horn unit in a housing provides mechanical protection for the horn. Moreover, the housing may be used to amplify the sound output intensity.

A horn unit according to the inventive concept may be an electronic horn, such as a no hum ducting or a hum ducting horn. The horn may be of trumpet type or snail type.

Further, the horn unit arranged in the housing may be attached to the housing with fixing members such that the horn can vibrate when in use. In this way, fewer vibrations may propagate into the vehicle and at the same time improve the sound output intensity outside the vehicle. For instance, it may be the attachment between the fixing members and the housing and/or the horn unit that may allow for the horn to vibrate. According to other possible implementations the fixing members themselves may the resilient, i.e. if deformed they return to their original shape, such as a spring or a plastic fixing member.

In possible embodiments, the sound output portion may be a horn-bell of the horn unit. Accordingly, it is the horn-bell which is attached to the air guide in an air tight manner. For example, in one possible embodiment, a flexible sealing member may be arranged to provide the air tight seal between a rim of the horn-bell and a cut-out portion of the air guide. Accordingly, a simple yet robust way of attaching the horn-bell to the air guide in an air tight manner is provided. The flexible sealing member may comprise rubber tubing.

In some embodiments, the horn unit may be attached to a vehicle body part with fixing members such that the horn unit can vibrate when in use. This may be advantageous in case the horn unit is not arranged in a housing.

The vehicle may be e.g. a car or a truck.

According to one embodiment, the horn unit may be arranged in a protrusion in the air guide, wherein the sound output portion comprises the outlet of the protrusion. In other words, the sound outputting portion seals against a surface of the air guide. The horn unit, including the additional components (electrical components, diaphragm, etc.) are arranged in the protrusion which may be seen as to serve as a housing accommodating the horn.

According to one embodiment of the invention, the air guide and horn unit are arranged on a first side of the shutter unit, the vehicle structure comprising a further air guide and horn unit arranged on a second side of the shutter unit, the first side and the second side being on opposite sides of a longitudinal center line of the vehicle, wherein the horns are arranged inclined at an angle towards the longitudinal center line. Thus, the horn units are arranged such that the sound waves are directed primarily towards the longitudinal center line, at an inclined angle with the longitudinal center line. The arrangement of the horns inclined towards the same center line may provide for constructive interference between the sound waves from the two horns. Accordingly, the sound intensity from the horns will be further increased by the constructive interference when the sounds from the horns are in phase.

The air guide and horn unit pairs may be symmetrically arranged with respect to the longitudinal center line. Accordingly, the horn units are arranged in front of but on opposite sides of the shutter unit, i.e. in the side-to-side direction of the vehicle, the first horn unit is arranged on the left side or the right side of the shutter unit and the second horn unit is arranged on the other one of the left side or the right side of the shutter unit.

Preferably, the air guide(s) is a lower air guide arranged below a crash beam of the vehicle. By placing the horn units in the lower air guides below the crash beam of the vehicle the impact on a pedestrian caused by the horn unit in case of a collision with a pedestrian is reduced compared to having the air guide with the horn arranged above the crash beam.

According to a second aspect of the invention there is provided a vehicle comprising the vehicle front structure according to any one of the preceding embodiments.

Effects and features of the second aspect of the invention are largely analogous to those described above in connection with the first aspect of the invention.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing example embodiments of the invention, wherein:

FIG. 5A conceptually illustrates an embodiment of the invention where a horn is arranged in a horn housing;

FIG. 5B conceptually illustrates an embodiment of the invention where a horn is arranged without a horn housing;

DESCRIPTION OF EMBODIMENTS

Figure 1:
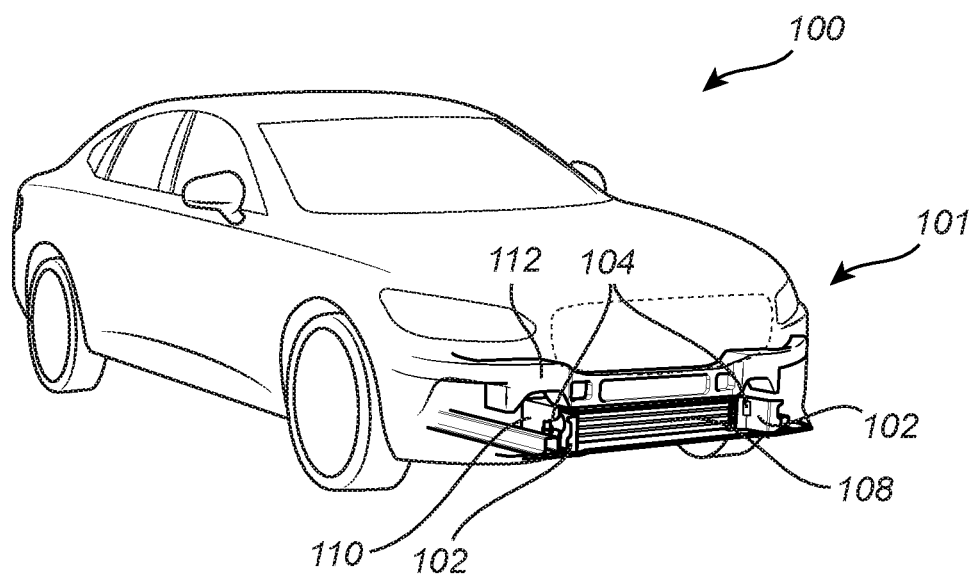
FIG. 1 conceptually illustrates a vehicle comprising a front structure according to an example embodiment of the invention.

In the present detailed description, various embodiments of the system and method according to the present invention are mainly described with reference to a car having a snail type horn. However, the present invention may equally be used for any other type of vehicle such as a truck or a bus. Further, various types of horns and sound emitting modules may be used, and the invention is not limited to the type shown herein. Thus, this invention may be embodied in many different forms and should not be construed as limited to the embodiments set forth herein; rather, these embodiments are provided for thoroughness and completeness, and fully convey the scope of the invention to the skilled person. Like reference characters refer to like elements throughout.

Figure 2:
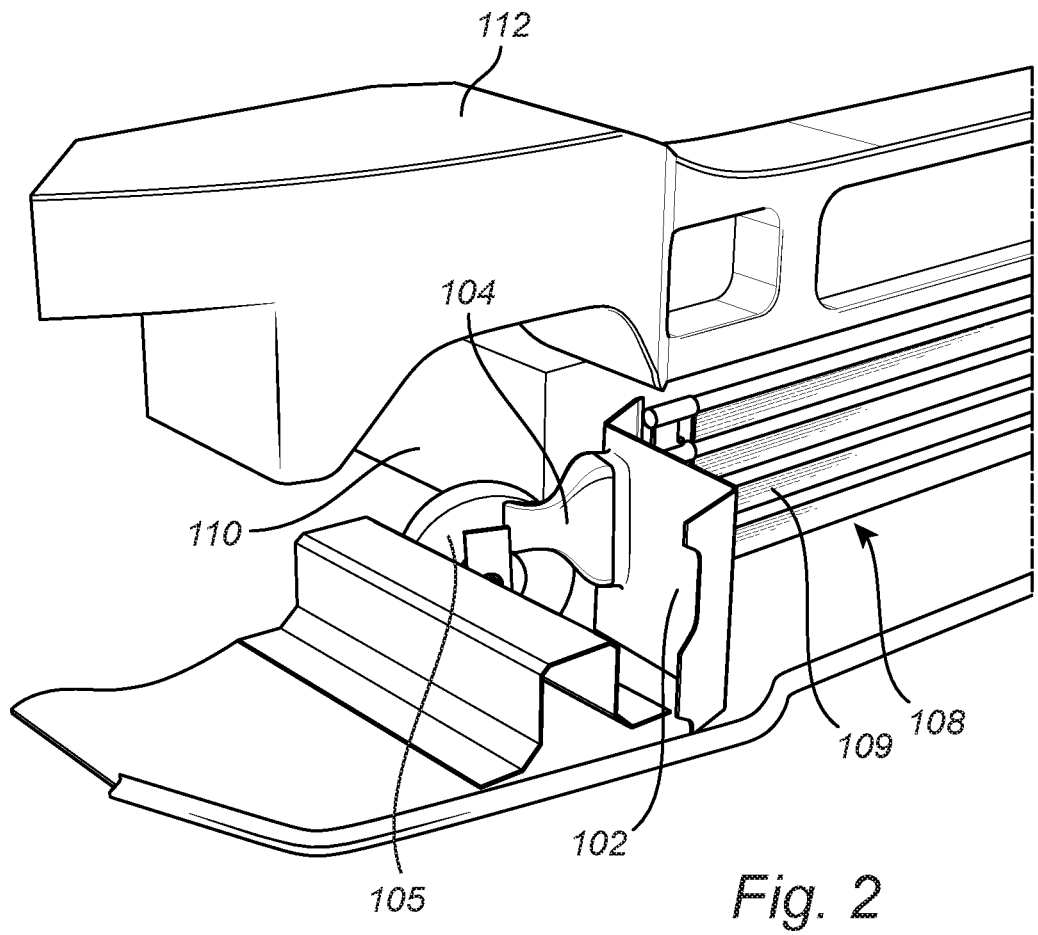
FIG. 2 conceptually illustrates a partial front side view of a vehicle front structure according to an example embodiment of the invention.

FIG. 1 shows a vehicle 100 comprising a vehicle front structure 101. FIG. 2 illustrates a close-up view of the left side of the vehicle front structure in FIG. 1. The vehicle comprises a cooling device 110 arranged in the front structure 101. The cooling device 110 (e.g. a radiator) is generally used for cooling an engine or other areas such as the air conditioning functionality of the vehicle 100 by providing cooled fluid to the vehicle engine (or other areas). In one possible implementation, the engine exchanges heat with the cooling fluid, which thereby transports the heated cooling fluid back to the cooling device 110. In the cooling device 110, the cooling fluid is again cooled, and the cooling is at least partly accomplished by airflow from the forward direction of the vehicle. The airflow is generated when the vehicle 100 is travelling.

In front of the cooling device 110, in the forward direction of the vehicle 100, is a shutter unit 108 arranged to control the air flow to the cooling device 110 coming from the forward direction. The shutter unit 108, may for example block the air flow from reaching the cooling device 110, or allow the air flow to flow through the shutter unit 108 and towards the cooling device 110. The shutter unit 108 comprises flaps 109 having a generally rectangular cross-section that are arranged to redirect the air flow (e.g. block or allow the air flow to pass to the cooling unit 110). The flaps are rotatable about an axis for blocking or allowing air to pass through the shutter unit 108.

An air guide 102 is arranged to redirect the air flow coming from the forward direction towards the shutter unit 108. The air guide 102 comprises a sheet material to redirect the air flow towards the shutter unit 108.

Although the air guides are herein illustrated as arranged on the sides of the shutter unit 108, the air guide may have further parts or portions arranged above and/or below the shutter unit. For example, the air guide may have a funnel shape (i.e. tapered shape) with the narrower side arranged towards the shutter unit 108. For clarity in the figures, only side parts of the air guides are shown, where the horn units are arranged in accordance with the inventive concept. The air guide may further be arranged with an air tight seal between the shutter unit 108 and the air guide such that air flow does not leak passed the shutter unit 108 when it is closed.

In order to avoid unnecessary air-leakage and to provide sufficiently loud sound from a horn unit, a sound output portion is attached to the air guide 102 such that an air tight seal is formed between a rim of a sound output portion and the air guide 102. The sound output portion is at least partly facing the forward direction of the vehicle. The arrangement of the horn unit 104 in the air guide is described in more detail with respect to subsequent drawings.

In front of the shutter unit 108 and the air guide 104 there may be a grill (not shown) which is air permeable to allow the air flow to flow towards the air guide 102 and the shutter unit 108.

Figure 3:
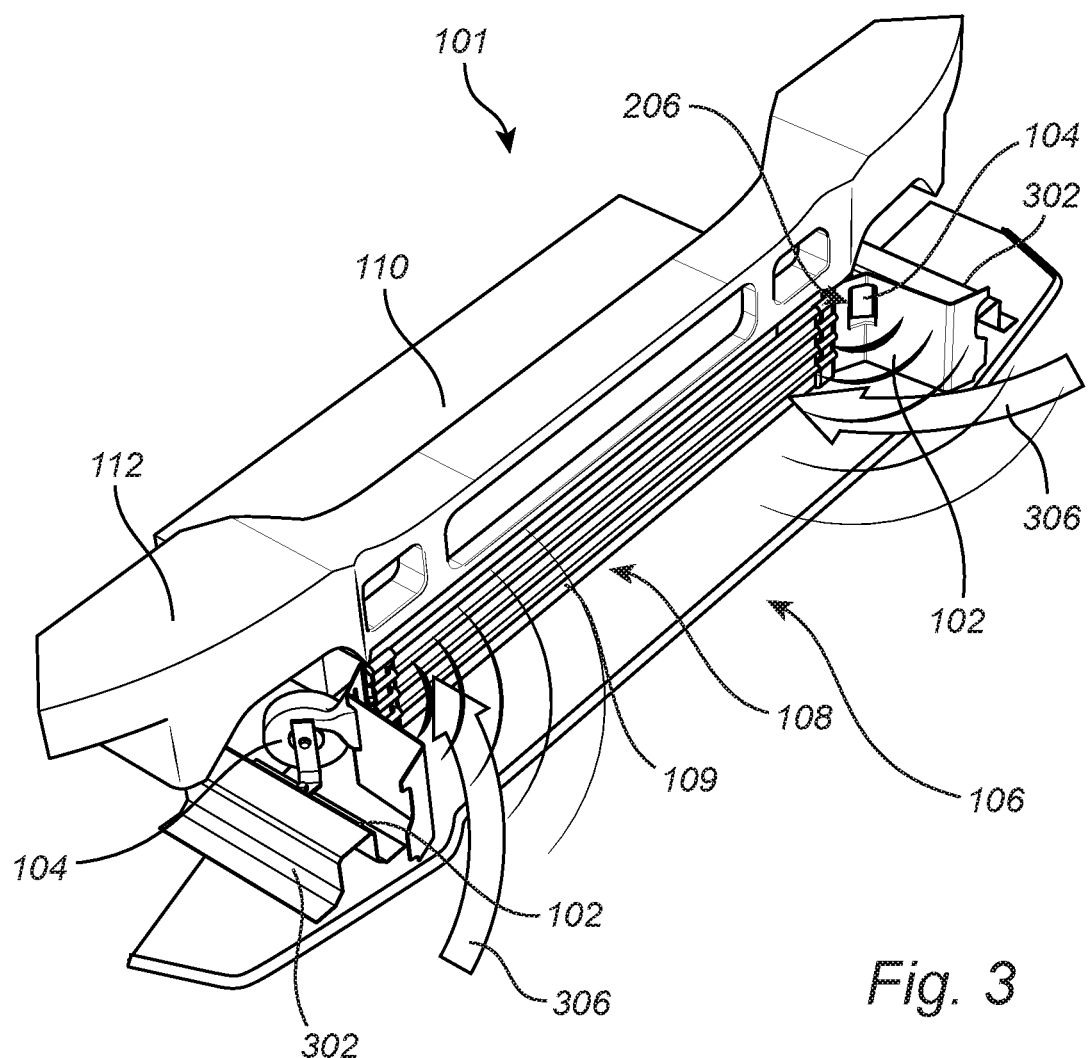
FIG. 3 conceptually illustrates a vehicle front structure.
Figure 4:
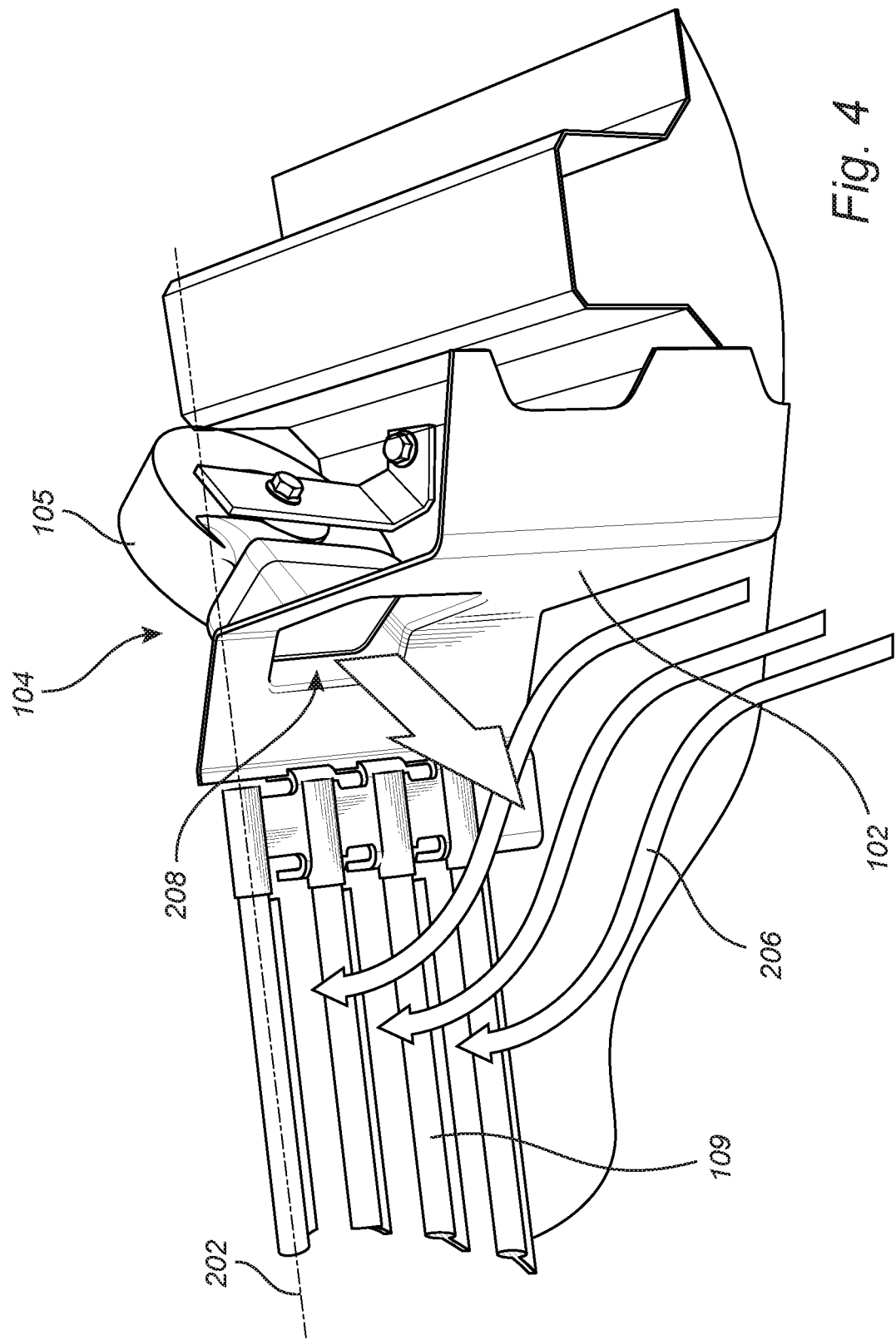
FIG. 4 conceptually illustrates another partial front side view of a vehicle front structure according to an example embodiment of the invention.

FIG. 3 shows a conceptual vehicle front structure 101 according to the inventive concept and FIG. 4 illustrates a close-up of one side of the vehicle front structure 101. In FIG. 3 the shutter unit 108 is shown arranged in front of the cooling device 110. The shutter unit 108 comprises flaps 109 being rotatable about a longitudinal axis of the respective flap 109. The longitudinal axis 202 (only one is shown, see FIG. 4) of the flaps 109 lies in a side-to-side direction of the vehicle 100. As the flaps 109 are rotated about their respective longitudinal axis 202, the shutter opens or closes the inlet formed in the shutter unit 108. The air guides 102 are arranged below a crash beam 112 of the vehicle front structure 101.

The air guide 102 is attached to a vehicle structure 302 and/or to the shutter unit 108 and is arranged adjacent to the shutter unit 108 such that an air flow 206 from the forward direction is redirected by the air guide towards the shutter unit 108. The air guide 102 thus serves to increase the total inflow of air to the shutter unit 108. A horn unit 104 is arranged to provide sound waves to a sound output portion 208 attached to the air guide 102.

Moreover, the horn unit 104 comprises a control portion 105 having the necessary electric circuitry and sound generating membranes, etc.

FIG. 5A is a conceptual drawing of an embodiment of the invention. In FIG. 5A is the horn unit 104 shown arranged in a housing 124. The air guide 102 is here illustrated partly cut in order to more clearly show the horn unit 104. The horn unit 104 comprises a horn bell 114 and the control portion 105. The sound output portion 208 is here formed by the outlet of the housing 124 and it is the rim 303 of the housing 124 that is attached to the air guide 102 with an air tight seal. The housing 124 is attached to the air guide 102 by e.g. welding or by a tubing pulled around the rim of the housing and around a rim 306 formed in the air guide. The horn unit 104 may be e.g. a snail type horn, a speaker, an exterior sound module, etc. The housing 124 is arranged in a cut-out portion 307 of the air guide 102.

The horn unit 104 is attached to the housing by means of fixing members 120 which allow the horn unit 104 to vibrate. The fixing members 120 may be resilient fixing members which thereby flexes back to an original shape after being temporarily deformed. Possible fixing members include springs or plastic fixing members that are attached with e.g. bolts or glue to the housing 124.

FIG. 5B shows another possible implementation in accordance of the inventive concept. Here, the sound output portion is where the sound exits the horn unit 104. In this example embodiment the sound output portion is comprised of the horn-bell 114 of the horn unit 102. The horn bell 114 may have a funnel shape and be a snail type horn.

The sound output portion, i.e. the horn-bell 114 is attached in a cut-out portion 307 of the air guide 102 in such a way that an air-tight seal is formed between the air guide 102 rim 306 in the cut out portion 307 and the rim 309 of the sound output portion 208. The air-tight seal may be provided by a tubing member 122 pulled over the rim 309 of the horn bell 114 and a protruding neck 304 formed in the cut-out portion of the air-guide 102. Other possible ways of sealing the connection between the rim of the horn-bell 114 and the air guide neck 304 may be to use a sealant such as silicone, acrylic sealants, latex sealants, or other polymeric sealant. Note that the list of possible sealants is non-exhaustive and that further possible sealants are within the scope of the invention.

Furthermore, a fixing member 120 is attached to the horn unit 104 and to a vehicle structure 312. The fixing member 120 allows the horn to vibrate when in use.

Figure 5C:
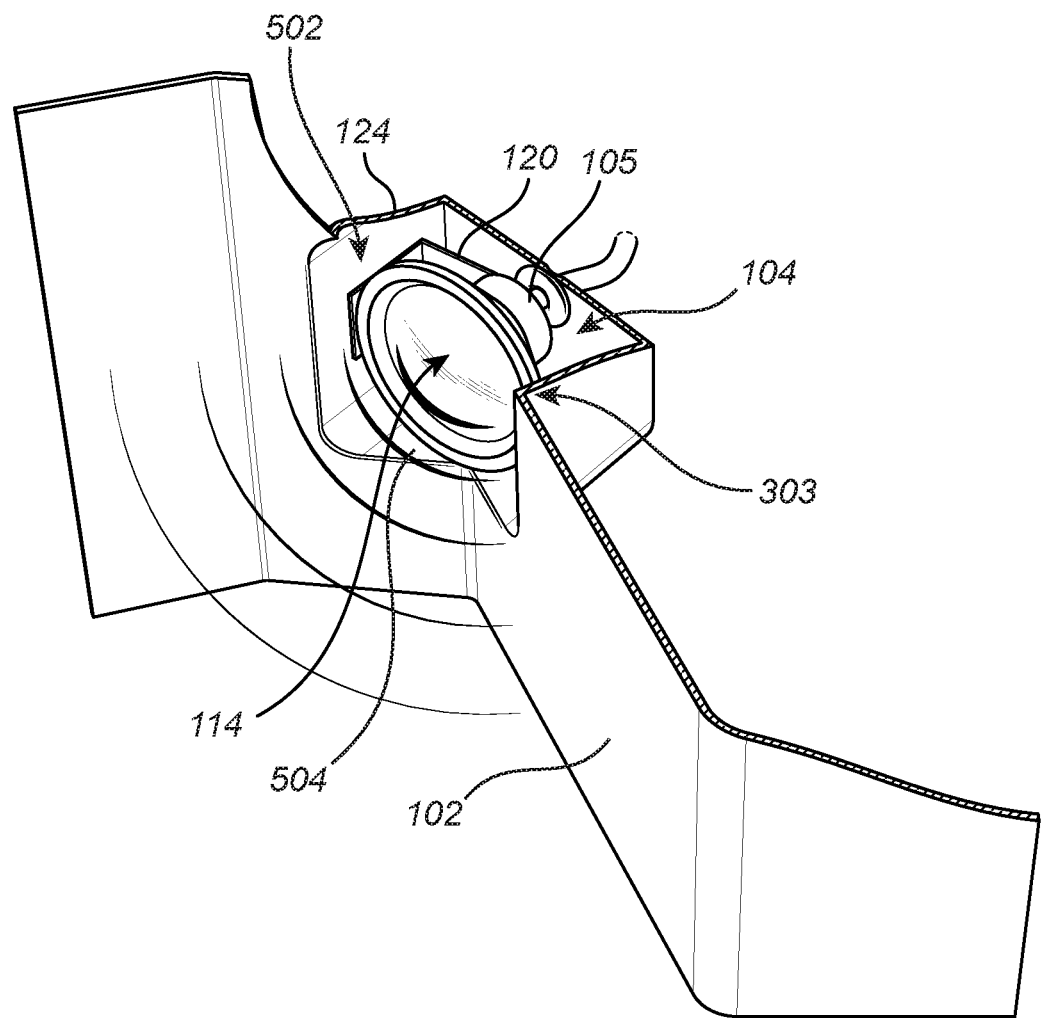
FIG. 5C conceptually illustrates an embodiment of the invention where a horn unit is arranged in a protrusion of the air guide, and FIG. 6 conceptually illustrates two horns arranged such that the sound wave from the horns undergoes constructive interference.

FIG. 5C illustrates another possible implementation in accordance of the inventive concept. Here, the horn unit 114 is arranged in a protrusion 502 formed in the air guide 102. The protrusion 502 is formed as part the air guide 102. The sound output portion is here comprised of the outlet 504 of the protrusion.

Figure 6:
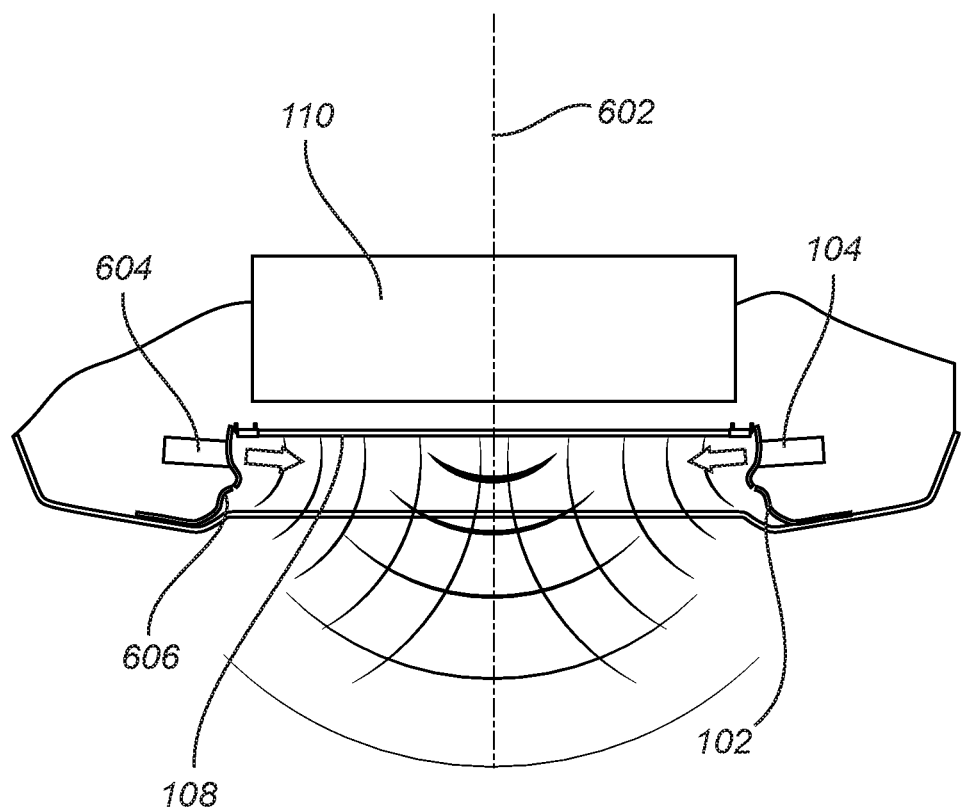

FIG. 6 is a schematic top view of an embodiment of the invention. According to the presently illustrated embodiment a first horn unit 104 is attached to a first air guide 102 arranged on one side with respect to the shutter unit 108. On the opposite side of a longitudinal center line 602 passing through the shutter unit 108, is a second horn unit 604 attached to a second air guide 606. Both the horn units 104, 604 are attached to their respective air guide 102, 606 such that an air tight seal is formed between the rims of the respective sound output portion and the corresponding air guide.

The horn units 104, 604 are arranged inclined at an angle towards the longitudinal center line 602. Thus, the sound output portions of the horn units 104, 604 are arranged such that the sound output portions are facing to direct their output sound waves at least partly towards the sound output portion of the other horn unit 104, 604. Moreover, the sound output portions of the horn units 104, 604 are arranged such that the sound waves emitted from the sound output portions interact with each other to form constructive interference. In this way, increase sound intensity is advantageously provided to the exterior of the vehicle front structure.

The person skilled in the art realizes that the present invention by no means is limited to the preferred embodiments described above. On the contrary, many modifications and variations are possible within the scope of the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. Any reference signs in the claims should not be construed as limiting the scope.

The invention claimed is:

1. A vehicle front structure comprising:
   a cooling device adapted to contain a cooling fluid configured to be cooled by an airflow received when the vehicle is moving;
   a shutter unit arranged to control the air flow and to redirect the air flow towards the cooling device,
   an air guide arranged in front of and adjacent the shutter unit, the air guide is arranged to redirect air flow coming from the forward direction of the vehicle towards the shutter unit; and
   a horn unit configured to provide a sound output signal to a sound output portion attached to the air guide in such a way that an air tight seal is formed between a rim of the sound output portion and the air guide, wherein a normal axis to an opening formed by the rim forms an angle with respect to the forward direction of the vehicle such that the normal axis of the opening of the sound output portion is facing at least partly in the forward direction of the vehicle.

2. The vehicle front structure according to claim 1, wherein the horn unit is arranged in a housing, wherein the sound output portion is part of the housing, whereby the rim of the housing walls are attached to the air guide in a cut-out portion of the air guide in an air tight sealing manner.

3. The vehicle front structure according to claim 2, wherein the horn unit is attached to the housing with fixing members such that the horn unit can vibrate when in use.

4. The vehicle front structure according to claim 1, wherein the sound output portion is a horn-bell of the horn unit.

5. The vehicle front structure according to claim 4, comprising a flexible sealing member arranged to provide the air tight seal between a rim of the horn-bell and a cut-out portion of the air guide.

6. The vehicle front structure according to claim 5, wherein the flexible sealing member comprises rubber tubing.

7. The vehicle front structure according to claim 4, wherein the horn unit is attached to a vehicle body part with fixing members such that the horn unit can vibrate when in use.

8. The vehicle front structure according to claim 1, wherein the horn unit is arranged in a protrusion in the air guide, wherein the sound output portion comprises the outlet of the protrusion.

9. The vehicle front structure according to claim 1, wherein the air guide and horn unit are arranged on a first side of the shutter unit,
   the vehicle structure comprising a further air guide and horn unit arranged on a second side of the shutter unit, the first side and the second side being on opposite sides of a longitudinal center line of the vehicle,
   wherein the horn units are arranged inclined at an angle towards the longitudinal center line.

10. The vehicle front structure according to claim 9, wherein the air guide and horn unit pairs are symmetrically arranged with respect to the longitudinal center line.

11. The vehicle front structure according to claim 1, wherein the horn-bell of the horn unit is a snail type horn bell or a trumpet type horn-bell, or an exterior sound module.

12. The vehicle front structure according to claim 1, wherein the air guide is a lower air guide arranged below a crash beam of the vehicle.

13. A vehicle comprising the vehicle front structure according to claim 1.

* * * * *